United States Patent [19]

Jeppesen, III et al.

[11] Patent Number: 5,052,001
[45] Date of Patent: Sep. 24, 1991

[54] MULTIPLE MEMORY BANK PARITY CHECKING SYSTEM

[75] Inventors: James H. Jeppesen, III, El Toro; Bruce E. Whittaker, Mission Viejo, both of Calif.

[73] Assignee: Unisys Corporation, Blue Bell, Pa.

[21] Appl. No.: 440,558

[22] Filed: Nov. 22, 1989

[51] Int. Cl.[5] .............................................. G06F 11/10
[52] U.S. Cl. ................................... 371/49.3; 371/51.1
[58] Field of Search ................... 371/49.3, 51.1, 49.1; 365/201, 200

[56] References Cited

U.S. PATENT DOCUMENTS

| 4,019,033 | 4/1977 | Parmet | 371/51.1 |
| 4,271,521 | 6/1981 | Mahmood | 371/51.1 X |
| 4,295,219 | 10/1981 | Draper | 371/51.1 |
| 4,355,393 | 10/1982 | Kubo | 371/51.1 |
| 4,464,755 | 8/1984 | Stewart | 371/51.1 |
| 4,800,535 | 1/1989 | McAlpine | 371/49.3 X |
| 4,809,278 | 2/1989 | Kim | 371/51.1 |
| 4,809,279 | 2/1989 | Kim | 371/51.1 |
| 4,849,978 | 7/1989 | Dishon | 371/51.1 X |

Primary Examiner—Robert W. Beausoliel
Attorney, Agent, or Firm—Alfred W. Kozak; Mark T. Starr

[57] ABSTRACT

A ROM/PROM memory system circuit structure provides for vertical expansion of data words while providing for enablement of parity checking by the addition of a single auxiliary ROM/PROM memory chip which duplicates the type and size of data memory chips. Additionally, selection means is provided to choose either an odd parity or an even parity format.

19 Claims, 3 Drawing Sheets

MULTIPLE MEMORY BANK PARITY CHECKING SYSTEM

FIELD OF THE INVENTION

This disclosure relates to memory structures having multiple banks of memory chips connected in vertical expansion of data words and serviced by circuitry for verifying the integrity of data words stored and retrieved.

CROSS REFERENCES TO RELATED APPLICATIONS

The following concurrently pending applications by the same inventors, James E. Jeppesen, III and Bruce E. Whittaker, are included herein by reference and relate to the present application:

a patent application entitled "Width-Expansible Memory Integrity Structure" filed Nov. 22, 1989 as U.S. Ser. No. 441,128;

a patent application entitled "System for Memory Data Integrity" filed, Nov. 22, 1989 as U.S. Ser. No. 440,821.

BACKGROUND OF THE INVENTION

A major module in the architecture of computer systems is the memory system which works in conjunction with the main processor and which memory system holds and supplies the data and instructions necessary to operation of the system. One such type of memory system involves the use of PROM memory modules which involve programmable read-only memory units which are generally used to hold "fixed" data for use of the computer system. Alternatively, read-only memories or ROMs are also used for this purpose.

The information stored in the PROM/ROM memory is critical to the integrity of system operation and such system operation can run into problems of data corruption should the data from the memory chip be corrupted or altered.

As examples of important and significant data which may reside in a PROM or a ROM memory system, are such items as:

(i) low level "bootstrap" (start-up) program code which is used to initialize a system;

(ii) specialized and unique information for system identification and configuration functions;

(iii) data integrity value information such as encryption or decryption keys.

The integrity of the ROM/PROM data is especially critical since a system may not yet be sufficiently initialized (up) enough at the period of initialization before other higher and more sophisticated levels of error detection are functioning operationally.

The general and common method of error detection in memory systems, whether RAMs (random access memories) or ROMs/PROMs is the use of the "parity" data system for checking data integrity.

Parity is a method whereby "extra" data bits are stored along with the "real" data bits. These extra bits, called "parity" bits contain a value that is based upon the value of the actual data package under consideration. At such time as the data information is read-out from memory, the parity bits are read-out as well.

The parity value of the "actual data read out" is recalculated from the real data bits (via a parity logic circuit) and the calculated parity value is then compared to the parity bit or bits read out from the parity memory. If these two values are equal, then there is a high probability that the actual data read-out is valid and free from errors that may have been induced during the writing-in, the storage, and the reading-out of the data in the memory subsystem. In this parity checking system for memory chips, several factors are extant:

(a) Extra storage elements (ROM/PROM chips) are required to store the parity bit(s);

(b) A means of collecting and checking out the parity bits must be added to this system structure.

One example of a parity check system in the prior art is shown in U.S. Pat. No. 4,809,279 which is commonly assigned to the same ownership as the instant application. This type system is limited to only one type of parity operation (odd parity) while the instant application provides a choice factor for using odd or even parity plus other advantages in terms of cost, efficiency and uniformity of memory chips.

In the present commercial marketplace, standard parity-checking integrated circuit chips (IC's) are available. These devices use one parity bit for each eight bits of information (data). Thus it can be realized that one bit of extra memory must be added to the memory system for each eight bits (data) of system memory width. Since most functioning practical systems have requirements for memory wider than eight bits, this can lead to problems involving additional cost consideration and space requirements in the system.

Due to this impracticability, it would appear that few systems use data integrity schemes for PROM/ROM memory data structures. Thus the architectural arrangement presented herein provides a means for reducing the cost of parity schemes in PROM memory systems, permits uniformity of PROM/ROM chips or modules, and most importantly, permits means for insuring the integrity of the memory system by permitting the detection of data corruption errors in the PROM/ROM memory banks. Additionally, the memory structure described has the feature of permitting the choice of odd or even parity schemes at will.

Because of the use of fewer memory chips and the uniformity of using the same type of memory chips, it is now possible to provide considerable efficiencies in operation and cost reduction.

SUMMARY OF THE INVENTION

By engaging the benefits of the uniform memory chips or memory modules, a memory subsystem for storing multiple numbers of data bytes (words) is connected to cooperate with a parity storage auxiliary memory chip such that each byte of data storage in the data storage auxiliary memory has a correspondingly related parity bit stored in the parity storage auxiliary memory. When the real data storage memory is addressed to access and read out a byte of data, then simultaneously the address will access the correspondingly related parity bit from the parity storage auxiliary memory. At this point a parity checking logic circuit can be used to receive the read-out real data from the data storage memory in order to calculate its parity and then to compare the calculated parity value with the predetermined parity value received from the parity storage auxiliary memory. Should any disparity occur between the two compared parity bits, then an error signal, will be generated for use in the system for subsequent corrective action.

Data banks of "vertically" stacked memory modules of a uniform type can be architecturally organized to expand the depth of memory locations while at the same type permitting a single parity storage auxiliary memory to be used to store and subsequently provide the appropriate related parity bit for any real data byte accessed. This then can be used in the parity checking logic unit for checking the calculated priority against the priority preset in the parity storage auxiliary memory. This structure provides for greater addressability, allowing more data words of a specified width to be available and additionally provides the selectable choice of using either "odd" parity or "even" parity format for the system as a matter of choice.

DESCRIPTION OF PREFERRED EMBODIMENT

Figure 1:
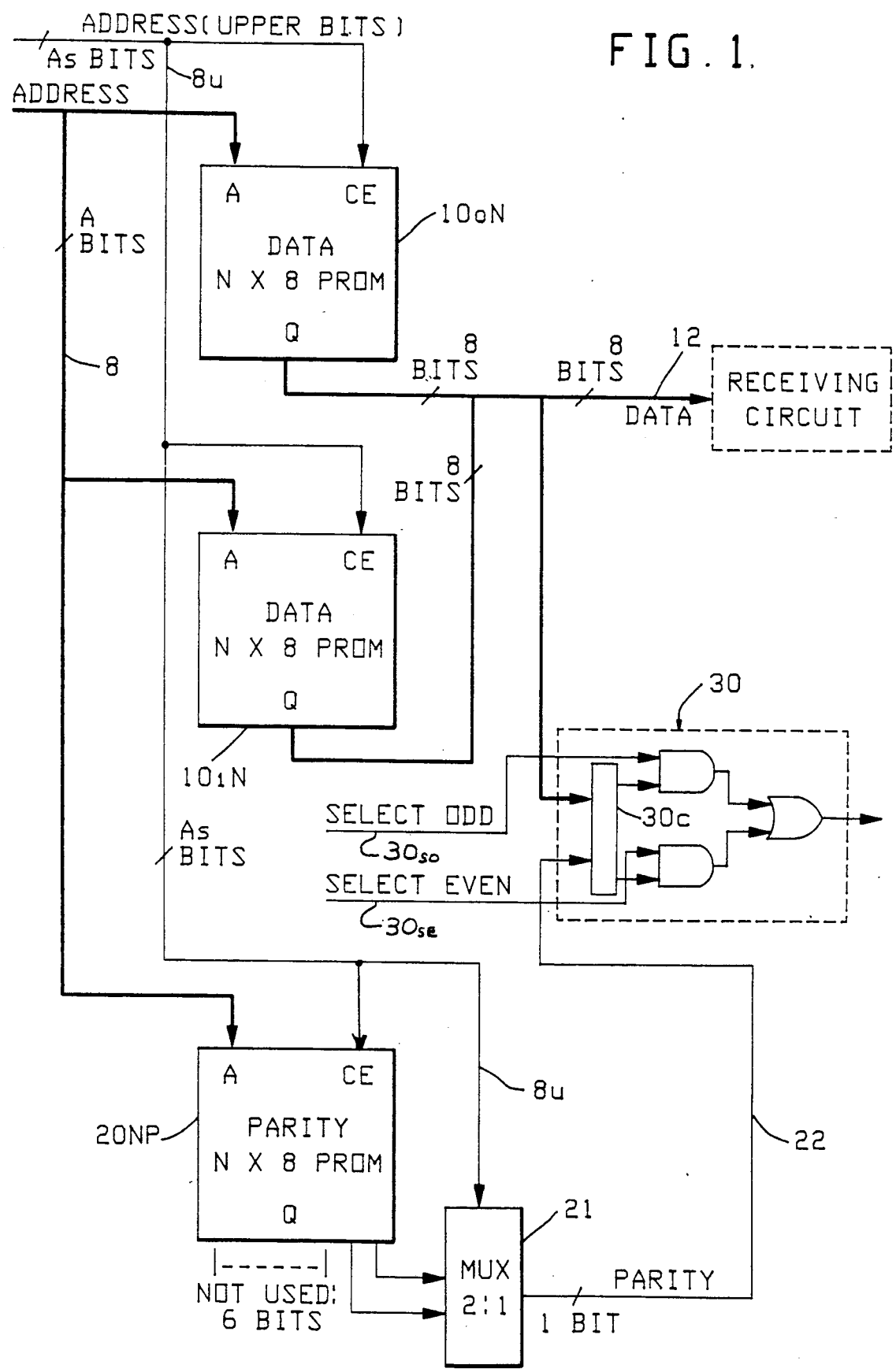
FIG. 1 is a block diagram and schematic showing the basic structure of a depth-expansible memory structure of fixed width data words working in cooperation with an auxiliary parity storage memory to provide information to a parity checking logic unit.

Referring to FIG. 1, the preferred implementation of the depth-expansible memory structure is shown in its minimal vertical expansion from one memory chip holding N thousand data bytes (of eight bits each) to a second duplicate-sized data PROM also holding N data words so that the memory structure has expanded from N thousand data words up to 2N thousand data words.

It may be noted that only one parity bit is required for each data byte in each of the data PROMs of the memory which are $10_{0N}$ and also $10_{1N}$. The architecture requires only one parity auxiliary PROM 20NP for the expanded structure, which structure shares the single chip parity PROM 20NP. An additional requirement is a very inexpensive "Quad 2-1 Multiplexer" chip such as that manufactured by Fairchild Camera and Instrument Company, Digital Division, whose address is 333 Western Avenue, South Portland, Me., and which type is designated as Type 74157. The Quad Multiplexer Chip 21 is used to accept the two output parity bits from the parity chip 20NP and to select the appropriate parity bit for output on line 22. The multiplexer in FIG. 1 is designated as element 21 while the memory structures are made of the data PROMs $10_{0N}$ and $10_{1N}$.

The data PROMs are connected as a matrix having the address line 8 which is also fed to the parity PROM 20NP There is an upper address line $8_U$ which enables one data PROM at a time through the chip enable input, CE. Additionally, the upper address line $8_U$ also selects one of the two parity bits which are received through the multiplexer chip 21 in FIG. 1.

The upper bit address lines $8_U$ of the address bus 8 only require a "1-bit" line in the case shown of the two data PROMs, where "k" equals 2, and represents the number of data PROMs. If "k" data PROMs were used, then the upper bit address lines $8_U$ would require $A_S$ lines where $A_S$ equals $\log_2$ of k.

In FIG. 1, the parity check logic circuit 30 is preferably made with a combination of two AND gates and one OR gate with a commercially available Parity Check Generator $30_C$ which receives the 8-bit accessed data word and the related parity bit. The type of parity system format to be used (odd or even) is selected through either one of the inputs $30_{so}$ or $30_{se}$. A typical type of Parity Check Generator is that designated as type 74280 as manufactured by the Fairchild Camera and Instrument Co., Digital Div., of So. Portland, Me.

Figure 2:
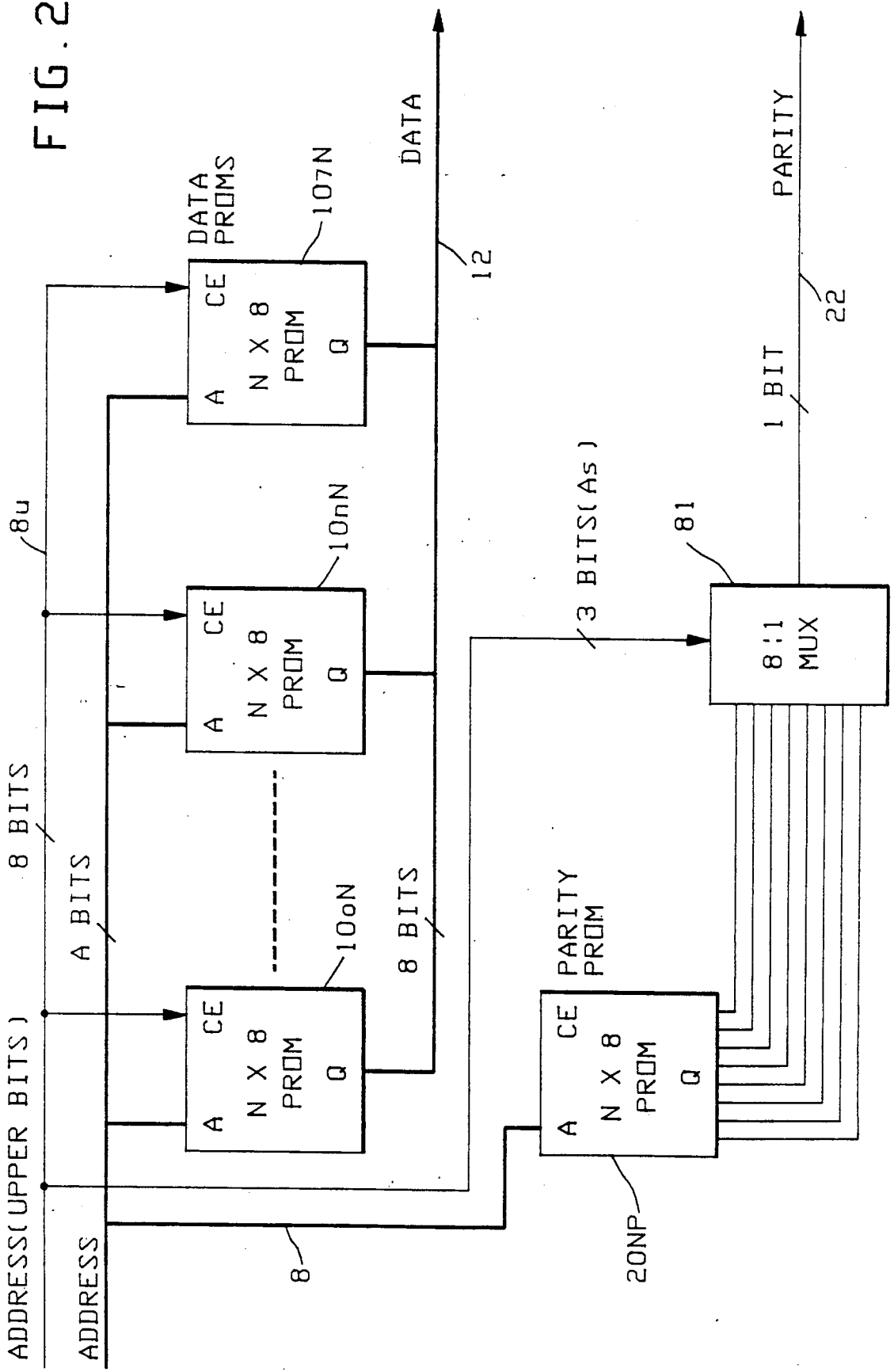
FIG. 2 is a block diagram showing a vertically expanded memory structure to provide the maximum depth expansion using a single 8-bit output parity PROM chip.

The minimally expanded structure of FIG. 1 is shown in an expanded form in FIG. 2 where the vertical depth of the memory system has been expanded to "8N" thousand bytes deep. This architectural arrangement can provide for expansion to this depth without the need for adding any additional parity PROM chips other than the initial parity PROM chip 20NP.

In FIG. 2, the vertically arranged data PROMs $N_{X8}$ are shown as $10_{0N}$, $10_{nN}$, $10_{7N}$ where each of these data PROMs is addressed by the address bus 8 which also addresses the parity PROM chip 20NP. Additionally, the upper bit address lines of three bits, designated as bus $8_u$ is used to reach the chip enable (CE) inputs of the data PROMs. The address lines bus $8_u$ is also used to activate the multiplexer 81 which has eight inputs and one output in order to provide the properly related parity bit on parity output line 22.

In the structure of FIG. 2, the upper three-line address ($A_s=3$) bits bus $8_u$ selects which of the eight data PROMs is to be enabled and additionally it selects (via multiplexer 81) which one of the eight output parity bits from the parity PROM 20NP, is used. The data PROMs are connected as a matrix. The lower address lines on bus 8 (composed of "A" bits) are the common address lines. The data lines of data output bus 12 are common with only one data PROM being enabled at a time. The upper address lines ($A_s$) of the bus $8_u$ select which data PROM is to be active. The upper address lines of bus $8_u$ also select which one of the eight parity PROM bits is used as the related parity bit by selection via an inexpensive 8-1 multiplexer chip 81.

The 1-bit parity line 22 and the eight bits of the output data bus 12 would then be used to provide inputs to the parity check logic unit 30 as shown in FIG. 1.

Figure 3:
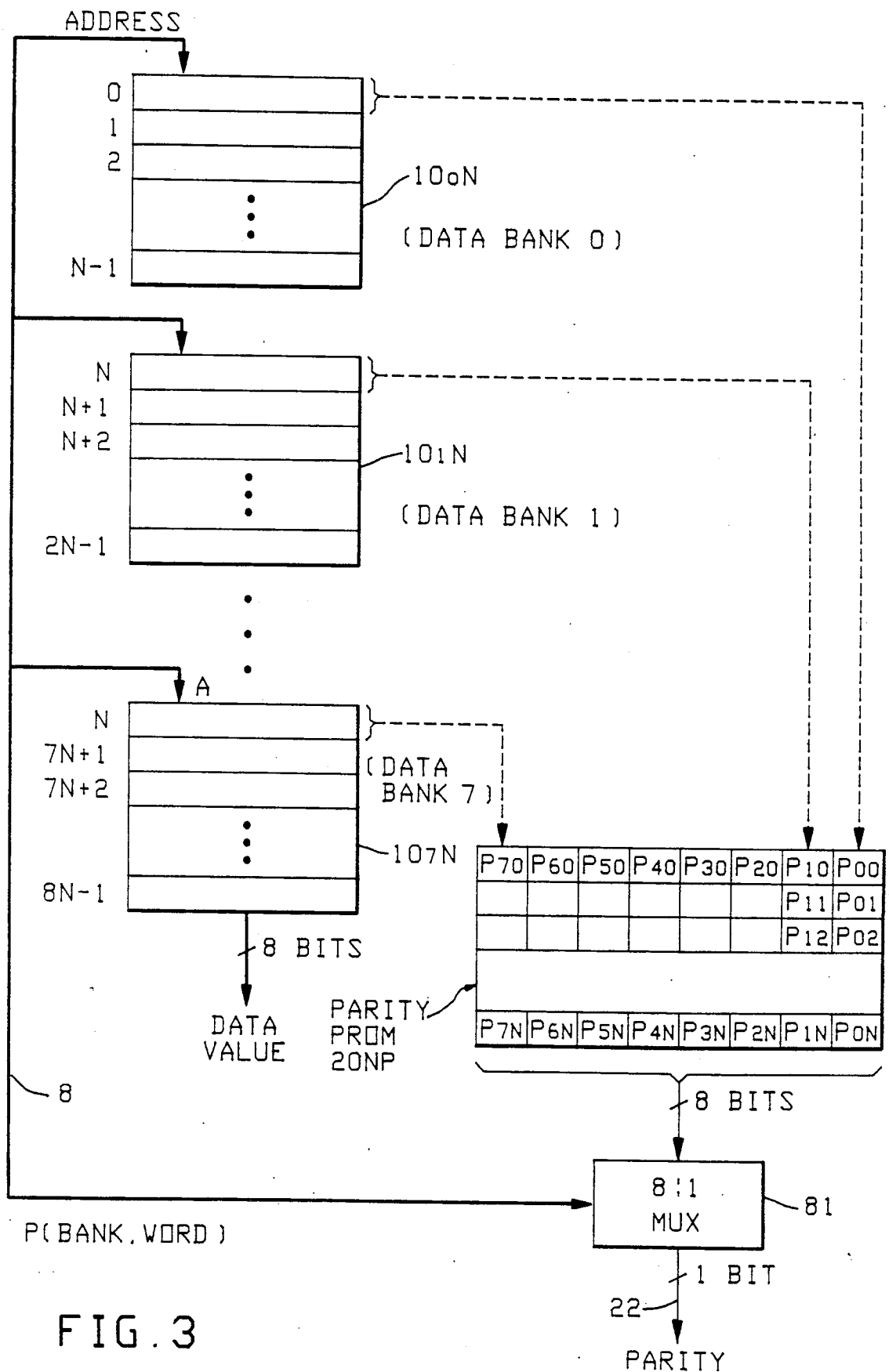
FIG. 3 is a schematic drawing showing a plurality of PROM memory data banks expanded vertically while being supported by an auxiliary parity PROM which supplies a particular value for each data byte in the system.

FIG. 3 is a schematic drawing showing how eight vertically arranged data banks having up to eight memory chips can be supported by an auxiliary parity memory chip which duplicates the type and size of the memory chips involved.

The single auxiliary parity PROM 20NP is sufficient to handle the architecture. As seen in FIG. 3, each parity bit position in the parity byte of the parity PROM corresponds to one bank (memory chip) of the data PROM structured arrangement. The structure is such that the first PROM data bank is designated as $10_{0N}$. The second data bank is designated as $10_{1N}$. The final data bank 7 is designated as $10_{7N}$.

The first data bank (data bank 0) has data bytes 0 through N-1. The second data bank 1 has data bytes N through 2N-1, . . . , the eighth data bank $10_{7N}$ carries data bytes 7N through 8N-1.

Corresponding to each of these particular data words in each of the particular data banks, there is a particularly related parity bit in the parity PROM 20NP. For example, the data byte 0 of the data bank 0 corresponds to the parity bit $P_{oo}$. The data byte N in data bank $10_{1N}$ corresponds to the parity bit $P_{10}$ of the parity PROM 20NP. The initial data byte 7N of the data bank $10_{7N}$ corresponds to the parity bit Phd 70 of the parity PROM 20NP.

The most significant three bits ($A_s$) of the address lines on address bus 8 allow eight PROM data banks (memory chips) to be read from. These three bits ($A_S$) of address from the address bus 8 also control a multiplexer chip 81 which steers the appropriate related parity bit required onto the parity line 22.

Since the number of data bank PROMs is eight (k=8), thus $A_s$ is equal to three bits, where the required upper address bits are $A_s$ is equal to $\log_2 k$, which in this case is "three" upper bit lines.

Described herein has been an expandable-in-depth memory structure which includes the use of a duplicate-type parity PROM shared by multiple numbers of data PROMs, and capable of selecting the appropriately related output parity bit for each accessed data word. The number of extra auxiliary PROMs needed for the memory structure for parity storage can be reduced to a minimum or in many cases can operate with only one N×8 parity PROM, and the memory structure can support selected choice of odd or even parity format for operations.

Since the PROM/ROM memory structures generally contain highly critical data information for the proper operation of the computer system, the ability to detect any data alteration or corruption at such a minimally added cost is deemed to be highly desirable.

Regarding the actual parity values which are predetermined and preset and stored in the auxiliary parity PROM, these can easily be calculated by a software program at the time that the program prepares the actual data bytes for storage. This is generally done through the process called "PROM burning". Since simple software programs can be written to create the parity PROM values from the data word byte values, no hardware costs are involved once the described system is built and loaded with its required information.

While the above described memory structure system for data integrity has been shown in its basic formulation, it may be understood that the concepts and intercooperating architecture presented may also be implemented through other configurations but which still fall within the definition of the following attached claims.

What is claimed is:

1. A memory structure comprising:
   (a) a plurality of ROM memory data chips storing data words and connected to a common address bus means where each memory chip is a type-duplicate of each other chip and each chip is connected to a common data output bus means;
   (b) a single auxiliary type-duplicate ROM memory parity chip holding a related predetermined parity bit for each data word in each said memory chip, said ROM memory parity chip holding multiple parity bits for multiple memory chips;
   (c) means for accessing a selected data word and its related parity bit for transmission to a parity check logic means;
   (d) said parity check logic means for determining the integrity of each data word accessed onto said common data output bus means.

2. The ROM memory structure of claim 1 wherein each said memory data chip stores "N" data words of "n" bits and the entire ROM memory structure has $N \times k = T$ data words, where k is the number of data memory chips and N is the number of addressable locations in each chip.

3. The memory structure of claim 2 wherein said common output bus means provides "n" bit lines and carries data words of "n" bits accessed from an addressed ROM memory data chip.

4. The memory structure of claim 3 wherein said single auxiliary type-duplicate memory parity ROM chip stores N×n predetermined parity bits.

5. The memory structure of claim 4 wherein said means for accessing includes:
   (a) said common address bus means providing "A" bits of address for selecting a specific data word where $A = \log_2 N$.

6. The structure of claim 5 wherein said means for accessing further includes:
   (b) "$A_S$" most significant bits of said common address bus means for controlling the selected output of a multiplexer means, where $A_S = \log_2 k$ bits and k is the number of said memory chips storing data words;
   (c) said multiplexer means connected to receive "n" parity bits from said single auxiliary memory parity ROM chip and for selecting the appropriately related parity bit for an accessed data word placed on said common data output bus means.

7. The structure of claim 6 wherein said parity check logic means includes:
   (a) means to calculate the parity bit value of an accessed data word on said common data output bus means;
   (b) means to compare said calculated parity bit value against said predetermined related parity bit to establish integrity of the data word accessed.

8. The structure of claim 6 which includes:
   (a) means for selecting an odd parity format or an even parity format for use in said parity check logic means.

9. The structure of claim 6 wherein the
said selected related parity bit is transmitted to said parity check logic means; and wherein said parity check logic means includes:
   (a) parity generator means to calculate the parity value of an addressed data word;
   (b) adjustment means to adapt to an odd parity or even parity protocol;
   (c) comparison means to compare said selected parity bit to said calculated parity bit.

10. An in-depth memory structure of uniform type ROM memory chips comprising:
   (a) a plurality of "k" ROM memory data chips where each chip stores N data words of n bits each, and each chip provides accessed output data to an output-word bus means of n bits, and wherein each said ROM chips is a duplicate of the other in size and type;
   (b) a single auxiliary ROM memory parity chip, duplicating the same type and size with N data words of n bits each, for storing a predetermined parity bit for each data word in said memory structure, and providing "k" parity output lines to a parity bit selection means;
   (c) addressing means for addressing a specific data word in any one of said "k" ROM memory data chips and for enabling output of said specific data word onto said output word bus means;
   (d) said output-word bus means for transmitting accessed output data to a receiver and also to a parity checking logic means;

(e) said parity bit selection means for selecting a predetermined parity bit associated with each addressed word and designated as the related parity bit, in said single auxiliary ROM memory parity chip, which relates to the accessed data word;

(f) parity checking logic means for calculating the parity bit value of an addressed data word and comparing said related parity bit with the said calculated parity bit value of said accessed data word;

11. The memory structure of claim 10 wherein said addressing means includes:
(a) address bus means having bit lines connected to each one of said "k" ROM memory data chips and to said single auxiliary ROM memory parity chip for addressing a specified memory location, and including:
  (a1) "$A_S$" address bus bit lines for control of said parity bit selection means, where $A_S = \log_2 k$ and k is an integer from "1" through "n".

12. The memory structure of claim 10 wherein said parity bit selection means includes:
(a) multiplexer means for receiving "n" output parity bit lines from said single auxiliary ROM memory parity chip and selecting one parity bit line for output;
(b) a set of "$A_S$" address bus bit lines carrying bits of the specified address for controlling said multiplexer means to select and transmit the properly related parity bit.

13. The structure of claim 10 wherein said parity checking logic means includes:
(a) means for receiving said accessed data word and calculating its parity value;
(b) means for receiving said predetermined related parity bit for comparison with said calculated parity value;
(c) means for transmitting an error signal if the said calculated parity bit and said predetermined parity bit are inconsistent.

14. The memory structure of claim 10 wherein said output word bus means provides the said accessed data word of n bits to a utilization receiver circuit and also to said parity checking logic means.

15. The memory structure of claim 10 where k equals 2 memory chips.

16. The memory structure of 15 where said output-word bus means carries 8 bits of information.

17. The memory structure of claim 15 wherein said parity bit selection means connects the address bit line carrying the said $A_S$ bit lines to each ROM memory chip and to a multiplexer means for enablement of each ROM memory chip and for controlling said multiplexer means to select the said related parity bit.

18. The memory structure of claim 10 wherein each ROM memory data chip and said single auxiliary ROM memory parity chip stores 2,048 data words of 8 bits each where N=2,048 and n=8 bits.

19. The memory structure of claim 10 wherein said parity checking logic means includes:
(a) selection means for utilizing an odd parity or an even parity format.

* * * * *